United States Patent [19]
Bell et al.

[11] Patent Number: 4,718,274
[45] Date of Patent: Jan. 12, 1988

[54] GRAVITY METER DIGITIZER

[76] Inventors: David B. Bell, 714 Bradfield Dr., Garland, Tex. 75042; Tommy K. Hubbell, 202 Broadway, Whitesboro, Tex. 76273

[21] Appl. No.: 429,517

[22] Filed: Sep. 30, 1982

[51] Int. Cl.[4] ............................................. G01M 1/12
[52] U.S. Cl. .................................. 73/382 R; 73/382 G
[58] Field of Search ...................... 73/382 R, 382 G; 364/550

[56] References Cited

U.S. PATENT DOCUMENTS

| | | | |
|---|---|---|---|
| 2,293,437 | 8/1942 | La Coste et al. | 73/382 |
| 2,377,889 | 6/1945 | La Coste et al. | 73/382 |
| 2,589,709 | 3/1952 | La Coste et al. | 73/382 |
| 2,589,710 | 3/1952 | La Coste et al. | 73/382 |
| 2,899,826 | 8/1959 | La Coste | 73/382 |
| 2,930,138 | 3/1960 | La Coste | 33/220 |
| 2,964,948 | 12/1960 | La Coste | 73/382 |
| 2,977,799 | 9/1955 | La Coste | 73/382 |
| 3,429,184 | 5/1965 | Russell | 73/382 |
| 3,474,672 | 10/1969 | La Coste et al. | 73/382 |
| 3,495,460 | 2/1970 | Ward | 73/382 R |
| 3,633,003 | 1/1972 | Talwani | 73/382 R |
| 3,717,036 | 2/1973 | La Coste | 73/382 |
| 3,722,289 | 3/1973 | Weber | 73/382 |
| 3,727,462 | 4/1973 | Stone et al. | 73/382 |
| 3,731,538 | 5/1973 | Jacoby | 73/382 |
| 3,815,418 | 6/1974 | Bradley | 73/382 |
| 4,040,189 | 8/1977 | La Coste | 33/304 |
| 4,121,464 | 10/1978 | Geiger | 73/382 R |
| 4,244,223 | 1/1981 | Geiger | 73/382 G |

Primary Examiner—Stewart J. Levy
Attorney, Agent, or Firm—Sigalos & Levine

[57] ABSTRACT

A digitizer for a gravity meter having a rotatable gradient readout dial and a null indicator, the digitizer comprising a shaft position sensor attached to the readout dial for providing a digital output signal representation of clockwise and counterclockwise rotation of the readout dial during nulling of said indicator, a microprocessor coupled to the shaft position sensor for receiving and storing the sensor digital output signal representation and means in the microprocessor for analyzing the stored digital output signals from the shaft position sensor and producing and storing a digitized output signal representing the gravity in the form of the average position of the readout dial on the gravity meter.

20 Claims, 3 Drawing Figures

GRAVITY METER DIGITIZER

BACKGROUND OF THE INVENTION

This invention relates to a digitizer for a gravity meter having a gravity readout dial and a null meter and, in particular, to a digitizer that monitors the rotation of the readout dial and produces and stores a digitized output signal representing the gravity at a particular location in the form of the average position of the readout dial on the gravity meter.

All gravity measurements necessarily are made in the gravitational field of the earth. Therefore, a knowledge of this field is required so that proper allowance for it can be made in reducing any kind of gravity measurement to a form useful for indicating geologic structure. The earth is not a perfect sphere. To a rather close approximation, its shape is that of a perfect fluid for which a balance is maintained between the gravitational forces tending to make it spherical and the centrifugal forces of rotation tending to flatten it. As a result of this balance the equatorial radius is about 21 kilometers greater than the polar radius. This flattening means that the acceleration of gravity is greater at the poles than at the equator.

For the application to geophysical prospecting, the interest in the gravity formulas lies in their use in making corrections for the normal northward or southward gravity increase. If the earth were a perfect fluid with no variations in density, its surface would correspond to an ideal ellipsoid of revolution, the so-called normal spheroid represented by the gravity formula. This would be a level surface and the direction of gravity everywhere would be perpendicular to this surface. Actually, as pointed out, the earth is not uniform in density and there are departures of the level surface from the normal or reference spheroid. The actual level surface may be considered as that of the oceans and the oceans as extended across land areas by imaginary deep canals. The level surface so defined is the "geoid." An ordinary level indicates a surface parallel to the geoid. A plumb line gives a direction normal to the geoid. The actual level surface is deformed or warped by the irregularities in density within the earth and the topographic irregularities of its surface. These deviations or deflections of the vertical can be determined by certain geodetic and astronomic measurements and also by surface integration of the gravity field around the point of calculation.

One of the instruments utilized for making gravity readings is a gravity meter such as those made by LaCoste & Rhomberg. These gravity meters, if utilized properly, indicate the gravity at a particular station or point.

To utilize these gravity meters, a very particular and precise procedure must be followed. First, the power must be applied to the meter and the gravity meter mechanism must be allowed to achieve thermal stability by allowing sufficient time to elapse after application of power to an internal heating element. During the time the instrument is being stabilized thermally, it must be carefully levelled in two axes using bubble levels. After the instrument has achieved thermal stability, a caging mechanism is released allowing the mechanism inside of the gravity meter to become operative. A coarse measurement of the nulling of the meter is obtained by rotating the vernier dial and utilizing an eyepiece and a scale located inside the instrument. The gravity meter vernier dial is then rotated until an error signal on a galvanometer is nulled for a fine measurement. After the fine error signal null is obtained, all of the levels have to be rechecked and again there must be a check for any drift in the error signal. The gravity reading is then written down as a combination of the vernier dial reading and an odometer style mechanical readout. Recording of the time of the reading, the day of the reading, and the location where the reading is obtained is done manually. The time and date are recorded so that gravitational effects of the moon and sun upon the meter at its latitude, longitude and elevation may be calculated and the gravity corrected for these effects.

A number of problems are encountered which cause reading errors in the above procedure to be obtained. First, seismic activity or nearby movement of vehicles can make it difficult to properly null the error signal since the instrument is so sensitive that the components continually move. Second, the gravity meter level adjustment may be disturbed inadvertently by the time all other adjustments are made and a reading is taken due to the earth's rotation and thus the change in lunar position and effect. Third, bubble level indicators are subject to interpretation error. Fourth, mechanical shock encountered in moving the gravity meter from one location to another can induce temporary or permanent reading error possibly accompanied by a reading error drift over a period of time. Fifth, nulling the error signal by means of the built-in indicators is subject to interpretation errors by the human operator, particularly when seismic or other disturbances are present as discussed earlier. Sixth, thermal stability may not be sufficiently complete for a variety of reasons such as failure to allow sufficient heating time since the last cool down which may be a matter of hours, exposure of gravity meter to excessive wind, sun or other thermal sources, and weakening of the batteries which provide power for the heater and the thermal control system within the gravity meter. Seventh, caging the mechanism may induce temporary error and drift in the gravity readings requiring a sufficient time to elapse before the reading is taken. Eighth, the gravity reading taken from the gravity meter may be misread and/or incorrectly logged. Ninth, the time of day and/or date of the reading and the location or position at which the reading is taken may be incorrectly logged.

The gravity meter digitizer of the present invention reduces these errors in several ways. First, the gravity meter reading is determined by electronically counting the precise number of turns of the gravity meter vernier dial (including fractional turns) and thus the dial reading is more accurately measured by the system than when observed by the human operator.

Second, failure of the operator to exactly null the error signal is compensated for by disallowing or prohibiting a gravity reading from being recorded if the error signal is not within predetermined tolerance limits and informing the operator by means of status indicators. Also, any error signal value that remains within tolerance limits will be recorded with the gravity reading itself so that compensation for the residual error may be made during the data analysis phase.

Third, any error signal variation due to seismic or local disturbances is reduced in the microprocessor element by means of a commonly known digital filtering and averaging algorithm utilizing a succession of samples of the error signal. The characteristics of this filtering/averaging algorithm are programmable via a storage/command unit.

Fourth, drift in the error signal due to thermal or mechanical effects as described earlier is detected by the same filtering/averaging algorithm. Recording of the gravity reading may be inhibited and status indicators will inform the operator.

Fifth, electronic level sensors are monitored by the microprocessor element. If the level sensors provide signals indicating that the spatial orientation of the gravity meter is out of predetermined allowable limits, status indicators tell the operator that the recording of the gravity signal is being inhibited. If the spatial error signal is within the predetermined tolerance limits, the residual level error is recorded with the gravity reading thus allowing compensation for its effect during data reduction.

Sixth, thermal conditions are monitored at several points within the gravity meter allowing detection of abnormal thermal gradients or drifts. Status indicators again inform the operator and may inhibit the recording of the gravity signals if the temperature exceeds the limits. If, however, the temperatures are within tolerance, the residual temperature error is recorded simultaneously with the gravity gradient signal again allowing compensation for its effect during data reduction.

Seventh, the gravity meter heater power is monitored by the microprocessor element and the value is recorded with the gravity readings. Out of tolerance values cause status indicators to warn the operator and inhibit the gravity readings from being recorded. If, however, the power limits are within predetermined tolerance limits, the residual power error is recorded with the gravity gradient reading again allowing compensation for its effect during data reduction.

Eighth, acceleration sensors are located on the gravity meter to detect acceleration due to forces other than gravity and are monitored by the microprocessor element and the number and severity of these forces, such as mechanical shocks received by the gravity meter, are stored and reported with the gravity readings. Excessive amounts of shock exceeding predetermined limits may cause the status indicators to warn the operator and may inhibit the recording of the gravity signals. Again, any residual acceleration error that remains within tolerance limits is recorded with the gravity gradient in order that compensation for its effect may be applied during data reduction.

Ninth, the precise time of day and date as taken from the internal clock is stored with each gravity reading recorded. Tenth, all of the above-described data making up a gravity reading is recorded electronically in the microprocessor and may be accessed for storage in an external unit as necessary. The stored signals may then be transferred to a computer for the necessary calculations.

All time, date, filter/averaging characteristics, tolerance limits (levels, temperature, power supply, error signal) and calibration functions are programmable by use of an external storage/command unit. A system of access codes or pass words associated with each of the above functions protects all parameters from unauthorized or accidental modification. Recording inhibition due to any parameter exceeding its tolerance limit may be overridden by special command. Recorded data is tagged appropriately to identify the particular parameter out of limits and its value.

SUMMARY OF THE PRESENT INVENTION

Thus, the present invention relates to a digitizer for a gravity meter having a rotatable gravity readout dial and a null indicator, said digitizer comprising a shaft position sensor attached to the readout dial for providing a digital output signal representation of clockwise and counterclockwise movement of the readout dial during nulling said indicator, a microprocessor coupled to the shaft position sensor for receiving and storing the sensor digital output signal representations, and means in the microprocessor for analyzing the stored digital output signals from the shaft position sensor and producing and storing a digitized output signal representing the gravity in the form of the average position of the readout dial on the gravity meter.

BRIEF DESCRIPTION OF THE DRAWINGS

These and other more detailed and specific objectives will be disclosed in the course of the following specification, reference being had to the accompanying drawings in which.

DETAILED DESCRIPTION OF THE DRAWINGS

Figure 1:
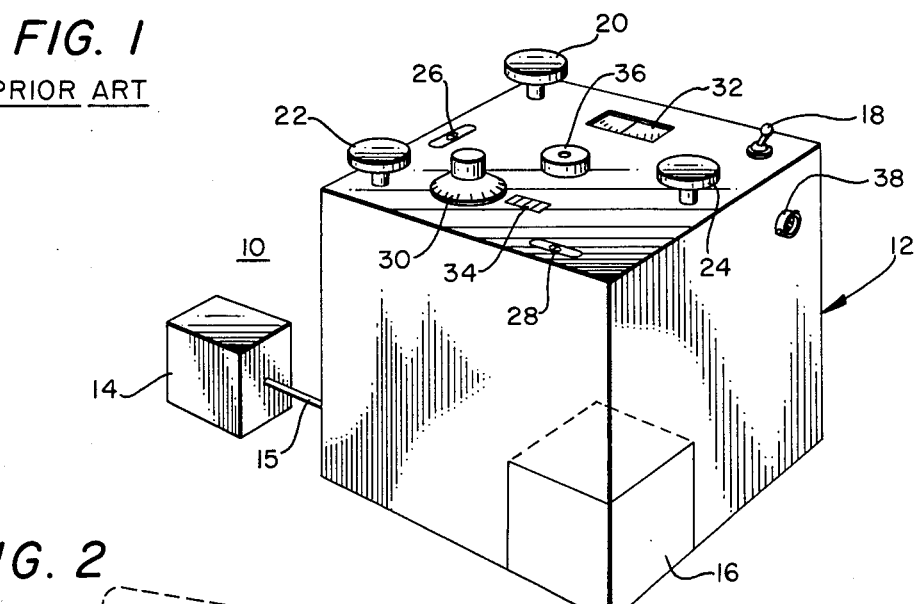
FIG. 1 is a schematic representation of a gravity meter presently used to obtain gravity readings and which may be modified for use with the present invention.

A gravity meter is shown and designated generally by the numeral 10 in FIG. 1 and is of the type which is of use today to take gravity readings and is also the type which may be modified by the present invention to reduce errors in the obtaining of a gravity reading and to store the gravity readings in digital data form to enable easier and more efficient data reduction.

The gravity meter 10 is placed in a housing 12 to which is attached a battery 14 by cable 15 to provide power thereto for the meters, heating elements and the like. A heating element 16 is schematically shown as being part of the gravity meter 10. An on/off switch 18 couples the power from the battery 14 to heating element 16 and the other power consuming elements in the gravity meter 10. Level controls 20, 22 and 24 are utilized to level the instrument while the operator looks at bubble levels 26 and 28 which are located on two axes of the gravity meter 10. It will be understood, of course, that the gravity meter 10 is very sensitive and the leveling of the instrument must be done extremely accurately. This allows errors to occur because it is difficult to read bubble levels with extreme accuracy. After the gravity meter 10 has been leveled and sufficient time has passed for thermal stability to be achieved within the instrument by means of the heating element 16, the internal mechanism (not shown) of the instrument (which has been caged) is released so that it can function properly. The vernier dial 30 is rotated until an error signal is nulled as indicated by sighting through an eyepiece scale 36. During the time that the vernier dial 30 is being rotated, an odometer type counter 34 is recording the coarse gravity signal while vernier dial 30 is recording the fine gravity signal. Thus, dial 30 is rotated in a clockwise and/or counterclockwise direction until a coarse null position is achieved as indicated by sighting through eyepiece 36. This null reading is of a necessity a coarse reading and therefore when it is nulled as near as can be determined, the operator looks at galvanometer 32 of said instrument 10 for a fine adjustment of the vernier readout dial 30. When the final null is obtained by centering the galvanometer 32, the gravity reading is taken combined from odometer style counter 34 and vernier dial 30. An electronic jack 38 is located on the side of the gravity meter to provide an electrical signal corresponding to the visual signal being used to null the galvanometer 32. Thus, that electrical signal is more accurate than the visual indication and can be recorded or utilized as indicated hereinafter by the present invention.

As stated earlier, gravity meter 10 is extremely sensitive and during the process of obtaining a gravity reading as heretofore indicated, the operator must be extremely careful to manually note the exact location of the instrument in longitude and latitude, the time of day and the date the readings are taken. Further, the operator must be assured of the exact leveling of the meter 10, the careful releasing of the caging mechanism, and the careful adjusting of the gravity meter vernier dial 30 until an accurate fine null of the error signal is noted by means of galvanometer 32 and the coarse adjustment through eyepiece 36. It will readily be understood that a mistake in any one of these functions will cause an error in the gravity reading and thus may destroy the value of the gravity reading obtained.

The present invention is intended to obviate some and minimize most of the errors as set forth earlier which could jeopardize the gravity readings taken. Thus, as shown schematically in FIG. 2, the gravity meter 10 has attached to the vernier readout dial 30 a shaft position sensor and encoder 40 which produces one set of digital pulses for clockwise rotation of vernier readout dial 30 and another set of pulses for counterclockwise rotation of vernier readout dial 30. These pulses are connected through cable 42 to digitizer 44. In addition, the electrical signal from jack 38, which is the gravity null error indication signal that can be visually read from galvanometer 32 as shown in FIG. 1, is also coupled to digitizer 44 via cable 46. Further, temperature sensors 48 of any well known type may be located in various areas of the gravity meter 10 to detect any abnormal thermal conditions which may result from over heating or cooling of the instrument due to the sun, wind, or other factors and produce a corresponding electrical signal. In addition, level sensors 50 are attached along two axes to gravity meter 10 in order to generate electrical signals indicating when the gravity meter 10 is exactly level.

Also, acceleration sensors 52 of any well known type are located along three axes of gravity meter 10 so that any acceleration along any axis or combination of axes is detected by these sensors and an electrical signal produced.

Finally, a sensor 54 of any well known type is coupled to the instrument power supply to monitor the power consumed by the heating element 16 located in gravity meter 10 and schematically illustrated in FIG. 1 so that any change in power applied to the heating element 16 either by means of a low battery, shorted circuit, or other factor, would cause a signal to be generated. These electrical signals produced by the thermal sensors 48, level sensors 50, acceleration sensors 52, and power sensor 44 are all coupled through cable 56 to digitizer 44.

Figure 3:
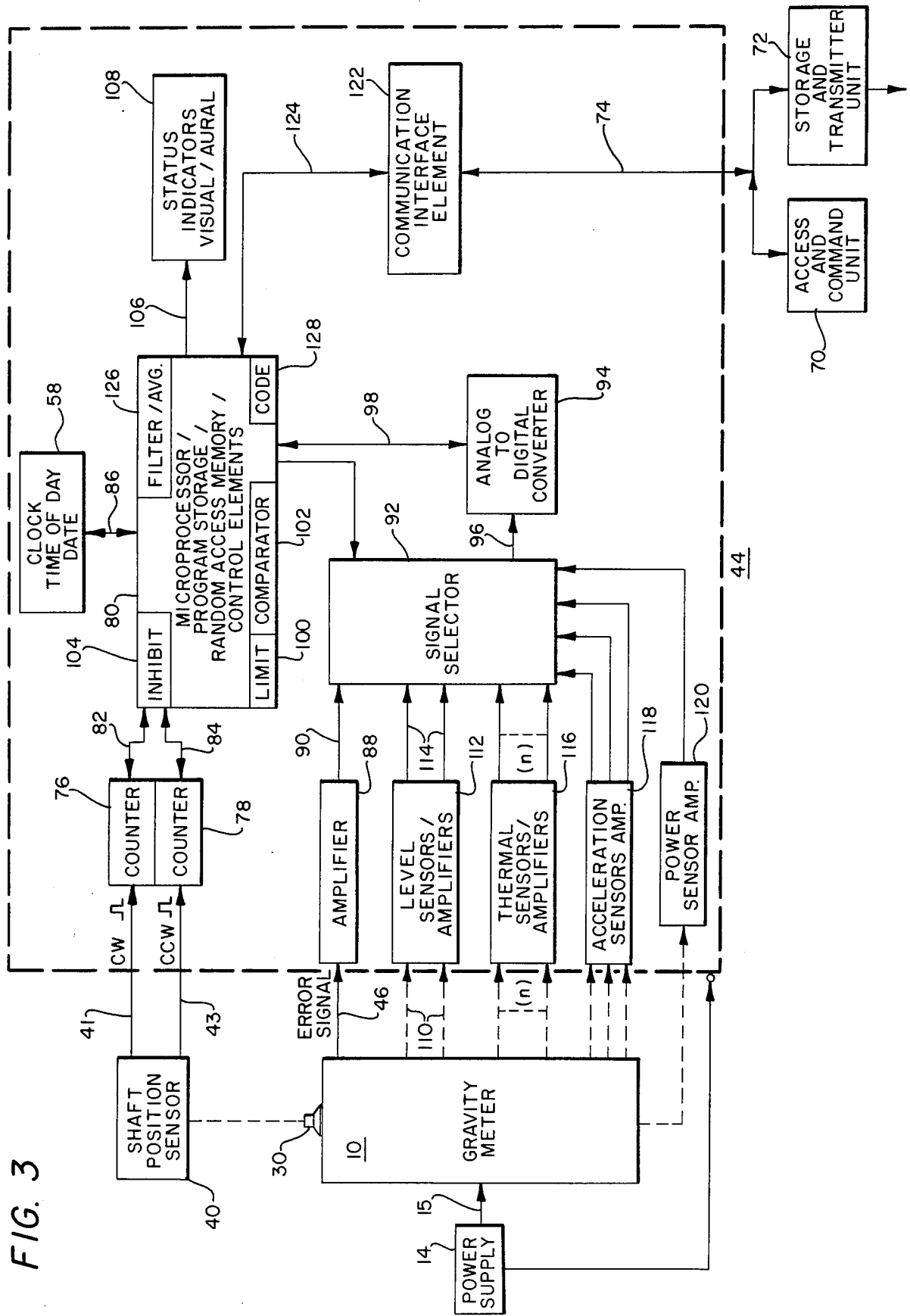
FIG. 3 is a schematic block diagram of the present invention illustrating the details of the digitizer and its connections with the gravity meter and output circuits.

A clock 58 is located inside of digitizer 44 which produces clock signals that are used by appropriate circuitry to produce time of day and date signals as well as the timing signals necessary for the operation of any of the electronic equipment inside of digitizer 44 such as a microprocessor 80 shown hereafter in FIG. 3. The digitizer 44 is constructed such that when a gravity signal is to be recorded via cable 42, the gravity null error on cable 46 is compared to a predetermined established null error tolerance limit diagrammatically illustrated by block 100 in FIG. 3 and if the null error exceeds that tolerance limit a status indicator 60 such as a light is illuminated indicating to the operator that the gravity signal is inhibited and thereby prevented from being stored because the gravity meter 10 is not properly nulled. In addition, if the null error on line 46 is within the tolerance limits but is nevertheless a residual error, it will be recorded in digitizer 44 so that it can be utilized at a later time during calculations to compensate the final gravity reading.

Also, if the thermal sensors 48 produce an electrical signal on line 56 indicating that the gravity meter 10 is not properly stabilized thermally, an indicator light 62 will be activated indicating to the operator that the thermal conditions of gravity meter 10 exceed predetermined limits and therefore the storage of the gravity signals on line 42 is inhibited. Again, if the thermal sensor 48 indicates an error signal on line 56 which is within the predetermined tolerance limits, but is nevertheless a residual error, it will be stored in the digitizer 44 so that it also may be used in the final calculations to compensate the final reading.

In like manner, if the level sensors 50 produce an electrical signal on line 56 to indicate there is an error in the leveling of gravity meter 10, these error signals are compared to predetermined tolerance limits and if the error signal exceeds those predetermined tolerance limits, an indicator 64 is activated thus notifying the operator that the gravity signal on line 42 is not being recorded because of the large level error produced by the level sensors 50. If the error is within the tolerances established, but is still a residual error, it is stored in digitizer 44 for use later in compensating the final reading during calculations.

In like manner, if acceleration sensors 52 produce a signal on line 56 which exceeds a predetermined acceleration limit, a status indicator 66 is activated to warn the operator that the gravity signal on line 42 is being inhibited. If, however, the acceleration error signal on line 56 is within the error limits established, the gravity signal is recorded along with the acceleration error signal on line 56 which is used at a later time to compensate for the error during the final calculations of the gravity signal.

Finally, if the power supply monitoring sensor 44 produces a signal on line 56 which exceeds predetermined power error tolerance limits which have been established, indicator 68 is activated which again warns the operator that the gravity signal on line 42 is being inhibited and that the reading must be retaken. If, however, the power error signal on line 56 is within the predetermined tolerance limits, the gravity signal on line 42 is recorded along with the error signal so that the error signal can be used at a later time to compensate during the final calculations of the gravity reading.

Further, each time a gravity reading is taken and recorded via line 42, clock 58 records the exact time of day and date so that each gravity signal that is recorded has associated with it the exact time of day that it was taken and the day on which it was taken. An access and command unit 70 which is external to digitizer 44 may be utilized in a well known manner to access the microprocessor 80 of the digitizer 44 and obtain the time, date and digitized gravity information and store it in a storage and transmission unit 72 for future transmission to a remote location for processing. In like manner, each of the signals monitored for which tolerances or limits have been set such as leveling or spatial orientation of meter 10, the acceleration, temperature, and heater power consumption, may have those tolerances or limitations set and/or changed by access and command unit 70. Thus each tolerance limit may be set for each function individually by access and command unit 70 and stored in digitizer 44. They function as set forth earlier to compare any error signal with the corresponding tolerance limit to see if it has been exceeded. In addition, access codes may be stored in digitizer 44 for each of the monitored functions so that they cannot be changed inadvertently. Thus, if the spatial orientation or leveling monitoring function needs to have the tolerance limits changed, the operator must first introduce the proper access code through access and command unit 70 to the digitizer before the digitizer would allow the code to be changed. The unit functions in a like manner for each of the other functions to be monitored which have tolerance limitations imposed.

Further, digitizer 44 places or assigns a digital signal or tag with each gravity signal recorded so that it can be individually identified when accessed at a later time.

Figure 2:
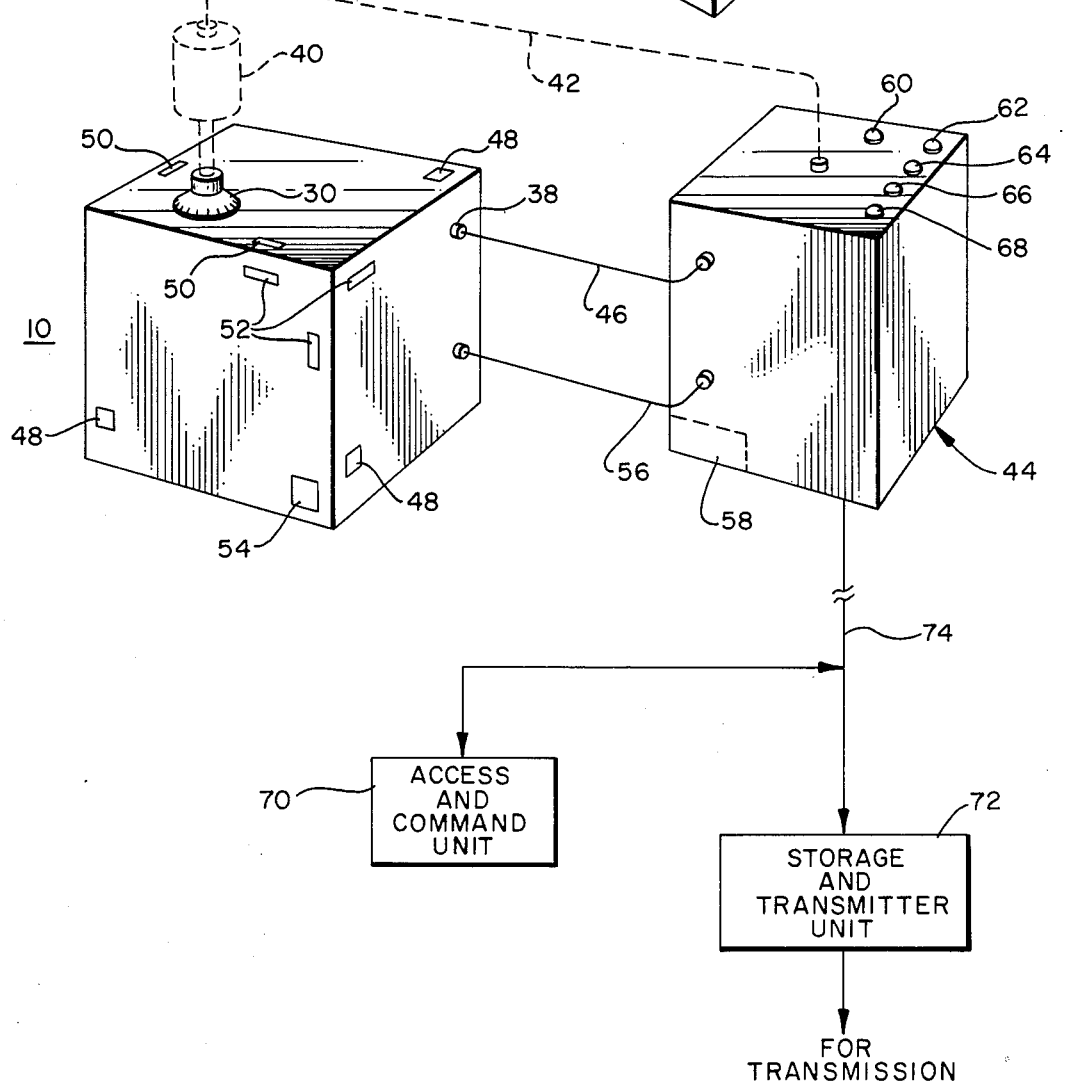
FIG. 2 is a diagrammatic representation of the present invention illustrating the modification of the gravity meter and the digitizer of the present invention.

Thus it can be seen by the schematic representation of the present invention as shown in FIG. 2 that each of the monitored functions including leveling or spatial orientation of the meter, the thermal condition of preselected areas in the meter, the acceleration of the meter 10 in any direction during the period of time in which the operator is obtaining the gravity signal and during transportation of the meter and any variation in the power being supplied to the heating element in the instrument are all automatically and accurately monitored with warnings given to the operator if those functions have errors exceeding predetermined tolerance limits and, if the residual errors nevertheless exist and fall within the tolerance limits as predetermined, they are recorded in the digitizer so that they can be used later during the calculations to compensate the final reading for the residual errors induced. In addition, the operator need not worry about entering the time and date since they are both automatically and accurately recorded during the recording of each gravity signal. Finally, the unit cannot have the tolerance parameters changed accidentally. The access codes must be known by the user before such changes can be incorporated. In like manner, at any time the data stored in the digitizer 44 is desired to be used externally at a remote unit, or is desired to be simply removed from digitizer 44 for storage or use in an external storage unit, access and command unit 70 may be used to command all of the data stored in digitizer 44 to be transferred via line 74 to storage and transmission unit 72 for later transmission to a remote unit such as a central computer.

FIG. 3 discloses a more detailed schematic diagram of the present invention. As will be seen therein, gravity meter 10 is powered by a power supply 14 coupled thereto through cable 15. Power supply 14 also provides the power to digitizer 44 through cable 17. Inasmuch as the power is supplied through cable 17 to all units within digitizer 44 that require power, for clarity of the drawings, the power supplied on line 17 is not indicated as connected to individual units in digitizer 44.

As explained earlier, the shaft position sensor 40 is mechanically mounted to rotatable vernier readout dial 30 so that as the operator rotates the vernier dial 30 to obtain the null position as indicated by galvanometer 32 and eyepiece 36 in FIG. 1, shaft position sensor 40 is producing digital pulses on line 41 for clockwise rotation of readout dial 30 and digital pulses on line 43 for counterclockwise rotation of vernier readout dial 30. Within the digitizer 44, a first counter 76 stores the pulses on line 41 which are produced by clockwise rotation of the vernier readout dial 30 while a counter 78 is coupled to line 43 and stores the pulses representing counterclockwise rotation of vernier readout dial 30. The counters 76 and 78 are coupled to microprocessor 80 by means of conductors 82 and 84. The microprocessor 80 has therein a circuit for analyzing the stored digital output signals in counters 76 and 78 which are received from the shaft position sensor 40 and producing and storing a digitized signal representing the gravity signal in the form of the average position of the readout dial 30 on the gravity meter 10. Obviously, a program may be used by the microprocessor 80 to do the analysis necessary to produce the digitized signal representing the gravity signal in the form of the average position of the readout dial 30. However, it could also be done by well known and existing mathematical logic circuits.

Clock 58 produces a continual time of day output along with date signals on line 86 which are received by microprocessor 80. Each time microprocessor 80 stores a gravity signal after calculations using the data stored in counter 76 and 78, it records the exact time of day and date on which the gravity recording was taken. Inasmuch as clocks and clock circuits are old and well known in the art the details are not disclosed herein.

As stated earlier, if the vernier dial 30 is not positioned properly to exactly null galvanometer 32 and the sight adjustment 36 shown in FIG. 1, an error signal is produced on line 46 which is coupled to an amplifier 88 in digitizer 44. The output of amplifier 88 on line 90 is coupled to a signal selector 92 which is under the control of microprocessor 80. If the error signal from amplifier 88 on line 90 is selected by signal selector 92 it couples that signal to the analog-to-digital converter 94 via line 96. The analog-to-digital converter (A-D converter) 94 changes the analog signal into a digital signal and couples it through line 98 to microprocessor 80 for storage therein.

It will be obvious that if the error signal is too large or exceeds predetermined limits, the gravity reading obtained from readout dial 30 would be valueless. Thus, limits of tolerance of the error signal are stored in storage unit 100 in microprocessor 80 and the digital signal on line 98 representing the error signal is compared by means of comparator 102 with the error limit tolerance signal stored at 100 and if the error exceeds those limits, a signal is sent to inhibitor circuit 104 which prevents the gravity signal from being stored by the microprocessor 80. In addition, a signal is produced on line 106 to status indicator 108 which either activates a light or a sound producing circuit which warns or indicates to the operator that a limit has been exceeded by an error signal.

In like manner, the signals from the level sensors 50 as shown in FIG. 2 are coupled by means of lines 110 to level sensor amplifiers 112 that produce an output on lines 114 which are again coupled to signal selector 92. If the microprocessor 80 selects the output of amplifiers 112, those signals are coupled through conductor 96 to the A-D converter 94 that digitizes the signals and produces an output on line 98 to microprocessor 80 where they may be stored if they are within the tolerance limits stored in microprocessor 80. If, however, they exceed the tolerance limits stored at 100 in microprocessor 80 as determined by comparator 102, again, inhibit circuit 104 is activated and the gravity signal cannot be recorded. In like manner, another status indicator 108 is activated from a signal on line 106 to warn the operator that the tolerance limits have been exceed by the level sensor signal. The same operation applies to the thermal sensors 48 shown in FIG. 2 which are coupled to thermal sensor amplifiers 116 and also applies to acceleration sensors 52 which are coupled to sensor amplifier 118 and power sensor 54 coupled to amplifier 120. In each case, if the error signal is greater than the tolerance limit established at 100, the comparator 102 produces an output signal to inhibit circuit 104 which prevents the recording of the gravity signal being taken at that time.

In like manner, in each of the cases, if there is a residual error signal but it is within the limits set forth by tolerance limit circuit 100, the gravity signal is recorded but the residual error signal is tagged with an identifier in a well known manner to associate it with a particular gravity signal and is also recorded so that corrections can be made during calculations to obtain a final gravity reading. Again, for each of the possible error signals, a status indicator exists which will warn the operator if that particular function being monitored exceeds predetermined tolerance limits.

As stated earlier, the access and command unit 70 may be used to produce signals on line 74 to a communication interface element 122 which is coupled to the microprocessor 80 via line 124 so that limit tolerances can be set and programs for the microprocessor 80 may be changed. Again, it will be pointed out that the command unit 70 may set up access signal codes 128 in the microprocessor 80 each of which codes is associated with each of the elements to be monitored so that the tolerance limits for those elements cannot be changed unless the operator knows the access signal code by which he can have access to that particular tolerance limit to change it. This prevents unauthorized use or inadvertent changing of the limits set therein. Finally, the command unit may access all of the information stored in the microprocessor 80 so that it is retrieved and stored in an external memory and/or transmitting unit 72 which might couple that information to a remote location such as a central computer for calculation and plotting of the gravity signals obtained at a plurality of stations.

Microprocessor 80 may include a filter and averaging circuit 126 whereby the microprocessor can receive a succession of samples of any functions which are being monitored such as acceleration, and cause those successive samples to be digitally filtered and averaged by unit 126 thereby reducing error signal variation. By means of access and command unit 70, a program may be introduced which changes the characteristics of the digital filter and averaging circuit 126 to meet predetermined conditions.

Thus, the gravity meter digitizer as disclosed and described in this specification has many advantages over the prior art method and apparatus for obtaining gravity readings. First, the number of turns of the gravity meter vernier dial 30 can be determined precisely because the number of turns and the partial turns can be more accurately counted and thus are more accurate than the system and method wherein the dial is rotated and observed by a human operator. Further, failure of the operator to exactly null the error signal by means of galvanometer 32 and eyepiece 36 is compensated for by disallowing a gravity reading to be recorded if the error signal is not within tolerable limits and by informing the operator by means of a status indicator. In addition, if the error signal or any other monitored signal has a value within predetermined tolerance limits, that residual error can be utilized to compensate the gravity signal during the data analysis phase. Further, by means of the digital filtering and averaging circuit in microprocessor 80, the error signal variations due to seismic or local disturbances are reduced considerably. Finally, any recorded data that is out of limits is appropriately tagged to identify it and to specify its value so that it can be taken into account during final calculations.

It is understood that suitable modifications may be made in the structure as disclosed provided such modifications come within the spirit and scope of the appended claims.

Having now, therefore, fully illustrated and described our invention, what we claim to be new and desire to protect by Letters Patent is:

1. A digitizer for a gravity meter having a rotatable gravity readout dial and a null indicator to obtain accurate gravity measurements, said digitizer comprising:
    a. a shaft position sensor attached externally of said gravity meter to said readout dial for providing a digital output signal representation of clockwise and counterclockwise rotation of said readout dial during nulling of said indicator,
    b. a microprocessor coupled to said shaft position sensor for receiving and storing said sensor digital output signal representation,
    c. means in said microprocessor for analyzing said stored digital output signals from said shaft position sensor and producing and storing a digitized output signal representing gravity in the form of the average position of said readout dial on said gravity meter,
    d. means on said gravity meter for generating an analogue error signal representing error in the exact nulling of said indicator by rotating said readout dial, and
    e. an analogue-to-digital converter coupled to said gravity meter and said microprocessor for receiving said analogue null error signal and providing a digitized output to said microprocessor for storage whereby said stored gravity signal may be corrected by said stored null error signal.

2. A digitizer for a gravity meter as in claim 1 further including:
    a. means in said microprocessor for storing digital signals establishing predetermined limits of said null error signal,
    b. means coupled to said analog-to-digital converter for receiving said digitized null error signal and to said error signal limit storing means for comparing said actual null error signal with said stored predetermined null error limits, and c. means in said microprocessor for inhibiting storage of said digital signals representing said gravity if said stored null error limits are exceeded.

3. A digitizer as in claim 2 further including means for producing an indication when said null error limits are exceeded.

4. A gravity meter digitizer as in claim 1 further including:
   a. means in said microprocessor for receiving a succession of samples of said digital error signals,
   b. means in said microprocessor for digitally filtering and averaging said digital error signals thereby reducing error signal variation, and
   c. means for selectively changing the characteristic of the digital filter and averaging means.

5. A digitizer for a gravity meter having a rotatable gravity readout dial and a null indicator to obtain accurate gravity measurements, said digitizer comprising:
   a. a shaft position sensor attached externally of said gravity meter to said readout dial for providing a digital output signal representation of clockwise and counterclockwise rotation of said readout dial during nulling of said indicator,
   b. a microprocessor coupled to said shaft position sensor for receiving and storing said sensor digital output signal representation,
   c. means in said microprocessor for analyzing said stored digital output signals from said shaft position sensor and producing and storing a digitized output signal representing gravity in the form of the average position of said readout dial on said gravity meter,
   d. level sensors attached to said gravity meter for producing analogue signals representing the spatial orientation of said gravity meter,
   e. an analogue-to-digital converter in said digitizer for receiving said analogue signal and providing a digitized output to said microprocessor representing said spatial orientation of said gravity meter whereby said stored gravity signal may be corrected by utilizing said stored level sensor error signal,
   f. means in said microprocessor for storing digital signals establishing predetermined limits of said spatial orientation of said gravity meter, and
   g. means coupled to said analogue-to-digital converter and said microprocessor for comparing said digital signals representing said actual spatial orientation with said limit establishing digital signals and producing an indication when said limits are exceeded by the actual spatial orientation of said gravity meter.

6. A gravity meter digitizer as in claim 5 further including means for storing said digital signals representing said meter spatial orientation that are within said predetermined limits thereby allowing said stored gravity signal to be compensation accordingly.

7. A gravity meter digitizer as in claim 5 further including means coupled to said indication producing means and said microprocessor for inhibiting storage of said gravity signals if said level sensor error signals exceed said stored predetermined limits.

8. A digitizer for a gravity meter having a rotatable gravity readout dial and a null indicator to obtain accurate gravity measurements, said digitizer comprising:
   a. a shaft position sensor attached externally of said gravity meter to said readout dial for providing a digital output signal representation of clockwise and counterclockwise rotation of said readout dial during nulling of said indicator,
   b. a microprocessor coupled to said shaft position sensor for receiving and storing said sensor digital output signal representation,
   c. means in said microprocessor for analyzing said stored digital output signals from said shaft position sensor and producing and storing a digitized output signal representing gravity in the form of the average position of said readout dial on said gravity meter,
   d. thermal sensors attached to said gravity meter for producing analogue signals representing the actual temperature of at least one location in said gravity meter,
   e. an analogue-to-digital converter receiving said analogue signals representing actual gravity meter temperature and producing digital signals representing said temperature,
   f. means for storing digital signals establishing predetermined limits of said gravity meter temperature, and
   g. means coupled to said analogue-to-digital converter and said temperature limit storing means for comparing said digital signals representing said actual temperature with said digital signals representing said temperature limits and producing an indication when said limits are exceeded.

9. A digitized gravity meter as in claim 8 further including means coupled to said thermal limit storing means and said microprocessor for inhibiting storage of said gravity signals if said thermal error signals exceed said limits.

10. A gravity meter digitizer as in claim 9 further including means for storing said digital signals representing said gravity meter temperature that are within said predetermined limits thereby allowing said stored gravity to be compensated accordingly.

11. A digitizer for a gravity meter having a rotable gravity readout dial and a null indicator to obtain accurate gravity measurements, said digitizer comprising:
   a. a shaft position sensor attached externally of said gravity meter to said readout dial for providing a digital output signal representation of clockwise and counterclockwise rotation of said readout dial during nulling of said indicator,
   b. a microprocessor coupled to said shaft position sensor for receiving and storing said sensor digital output signal representation,
   c. means in said microprocessor for analyzing said stored digital output signals from said shaft position sensor and producing and storing a digitized output signal representing gravity in the form of the average position of said readout dial on said gravity meter,
   d. acceleration sensors attached to said gravity meter so as to detect actual acceleration of said gravity meter by forces other than gravity in at least one plane and produce analogue signals representative of said actual acceleration due to forces other than gravity,
   e. an analogue-to-digital converter in said digitizer for receiving said analogue signals and producing digital signals representing said actual acceleration of said gravity meter in said at least one plane, f. means for storing digital signals establishing predetermined limits of acceleration for said gravity meter, and g. means coupled to said analogue-to-digital converter and said acceleration limit storing means for comparing said digital signals representing said actual acceleration with said digital signals representing said predetermined limits of acceleration and producing an indication when said predetermined limits of acceleration are exceeded.

12. A gravity meter as in claim 11 further including means coupled to said comparing means and said microprocessor for inhibiting storage of said gravity signals if said actual acceleration exceeds said established limits.

13. A gravity meter digitizer as in claim 12 further including means for storing said digital signals representing said gravity meter acceleration that are within said predetermined limits thereby allowing said stored gravity signals to be compensation accordingly.

14. A digitizer for a gravity meter having a rotatable gravity readout dial and a null indicator to obtain accurate gravity measurements, said digitizer comprising:

a. a shaft position sensor attached externally of said gravity meter to said readout dial for providing a digital output signal representation of clockwise and counterclockwise rotation of said readout dial during nulling of said indicator, b. a microprocessor coupled to said shaft position sensor for receiving and storing said sensor digital output signal representation, c. means in said microprocessor for analyzing said stored digital output signals from said shaft position sensor and producing and storing a digitized output signal representing gravity in the form of the average position of said readout dial on said gravity meter, d. a heater in said gravity meter, e. means in said gravity meter for monitoring the power of said heater and producing an analogue signal representative of said actual heater power, f. an analogue-to-digital converter in said digitizer for receiving said analogue signal representing said heater power and producing said corresponding digital signals, g. means for storing digital signal representing predetermined limits of power consumed by said heater, and h. means coupled to said analogue-to-digital converter and said power limit establishing means for comparing actual heater power signals with said predetermined power limit signals and producing an indication if said actual power exceeds said predetermined limits.

15. A digitizer as in claim 14 further including means coupled to said storage means for inhibiting storage of said digital signals representing said gravity signals if said actual power exceeds said predetermined limits.

16. A gravity meter digitizer as in claim 15 further including means for storing said digital signals representing actual power consumption of said heater when said digital signals are within said predetermined limits thereby allowing said stored gravity signals to be compensated accordingly.

17. A digitizer for a gravity meter having a rotatable gravity readout dial and a null indicator to obtain accurate gravity measurements, said digitizer comprising:

a. a shaft position sensor attached externally of said gravity meter to said readout dial for providing a digital output signal representation of clockwise and counterclockwise rotation of said readout dial during nulling of said indicator, b. a microprocessor coupled to said shaft position sensor for receiving and storing said sensor digital output signal representation, c. means in said microprocessor for analyzing said stored digital output signals from said shaft position sensor and producing an storing a digitized output signal representing gravity in the form of the average position of said readout dial on said gravity meter, d. means for monitoring said gravity meter spatial orientation, acceleration, temperature and heater power consumption and producing signals representative thereof, e. means for establishing corresponding predetermined tolerance limitations for each of said representative signals, and f. means for comparing each of said representative signals with said predeterminded limitations each time said gravity signal is stored and producing an indication if any one of said predetermined tolerance limitations is exceeded by a corresponding one of said representative signals.

18. A digitizer for a gravity meter as in claim 17 further including:

a. means for digitizing each of said representative signals, and b. means for storing each of said digitized signals that are within said limits each time a gravity signal is stored thereby allowing said gravity signal to be compensated accordingly.

19. A digitizer for a gravity meter as in claim 18 further including means for inhibiting storage of said gravity signal whenever any one of said representative signals exceeds said predetermined limits established therefor.

20. A digitizer for a gravity meter as in claim 19 further including means external of said digitizer for establishing each of said tolerance limitations for each of said representative signals.

* * * * *